United States Patent [19]
Yamada et al.

[11] Patent Number: 5,255,260
[45] Date of Patent: Oct. 19, 1993

[54] OPTICAL RECORDING APPARATUS EMPLOYING STACKED RECORDING MEDIA WITH SPIRAL GROOVES AND FLOATING OPTICAL HEADS

[75] Inventors: Noboru Yamada, Hirakata; Isao Satoh, Neyagawa; Sadao Mizuno, Ibaraki; Yasuhiro Gotoh, Kadoma, all of Japan

[73] Assignee: Matsushita Electric Industrial Co., Ltd., Osaka, Japan

[21] Appl. No.: 555,639

[22] Filed: Jul. 23, 1990

[30] Foreign Application Priority Data

Jul. 28, 1989 [JP] Japan .................................. 1-197741
Nov. 15, 1989 [JP] Japan .................................. 1-296531

[51] Int. Cl.$^5$ ...................... G11B 17/028; G11B 7/24; G11B 7/12
[52] U.S. Cl. ...................................... 369/199; 369/36; 369/283; 369/284; 360/103
[58] Field of Search .................. 369/195, 198, 199, 34, 369/36, 38, 39, 280, 283, 284, 286, 288, 13; 360/103

[56] References Cited

U.S. PATENT DOCUMENTS

| | | | |
|---|---|---|---|
| 3,739,359 | 6/1973 | Waring, Jr. | 360/59 |
| 4,214,287 | 7/1980 | Stromsta et al. | 360/103 |
| 4,360,908 | 11/1982 | Howe et al. | 369/275.1 X |
| 4,387,452 | 6/1983 | Bricot et al. | 369/199 X |
| 4,542,495 | 9/1985 | Ziegler et al. | 369/291 X |
| 4,556,969 | 12/1985 | Treseder et al. | 369/291 |
| 4,569,038 | 2/1986 | Nagashima et al. | 369/44.26 |
| 4,577,756 | 3/1986 | Hennessy et al. | 369/280 X |
| 4,633,450 | 12/1986 | Gueugnon | 369/13 |
| 4,675,855 | 6/1987 | Iso et al. | 369/33 X |
| 4,725,345 | 2/1988 | Sakamoto et al. | 204/192.31 |
| 4,737,947 | 4/1988 | Osato et al. | 369/13 |
| 4,813,011 | 3/1989 | Kulakowski et al. | 369/32 |
| 4,839,883 | 6/1989 | Nagata et al. | 369/286 |
| 4,888,751 | 12/1989 | Yoshimaru et al. | 369/199 X |
| 4,901,185 | 2/1990 | Kubo et al. | 360/103 |
| 4,955,006 | 9/1990 | Fukushima et al. | 369/13 |
| 5,082,827 | 1/1992 | Barnes | 360/105 |
| 5,124,961 | 6/1992 | Yamaguchi et al. | 360/103 |

FOREIGN PATENT DOCUMENTS

57-150145 9/1982 Japan .
60-261052 12/1985 Japan .
64-35734 2/1989 Japan .

Primary Examiner—Eugene R. LaRoche
Assistant Examiner—Michael C. Kessell
Attorney, Agent, or Firm—Stevens, Davis, Miller & Mosher

[57] ABSTRACT

The apparatus includes optical recording media each of which includes a single plate substrate with recording layers and spiral grooves formed on both sides of the substrate and which are available for recording and reproduction or for recording, erasing and reproduction via irradiation with laser beams. Both surfaces of the recording media are available for simultaneous access, and a plurality of thin floating-type optical heads are provided to irradiate laser beams onto the recording media. The optical heads are respectively provided at each side of the recording media and float, responsive to rotation of the recording media, above the respective surfaces of the recording media at a distance of at most hundreds of microns. The combination of these optical recording media and optical heads makes it possible to stack plural pairs thereof within an ultra-thin space, thus greatly improving the on-line capacity of the optical recording apparatus.

17 Claims, 6 Drawing Sheets

OPTICAL RECORDING APPARATUS EMPLOYING STACKED RECORDING MEDIA WITH SPIRAL GROOVES AND FLOATING OPTICAL HEADS

BACKGROUND OF THE INVENTION

The present invention relates to an optical recording apparatus for recording information on a recording medium with use of high density energy beams such as a laser beam.

A rewritable optical recording medium is capable of being recorded at a density much higher than that of a rewritable magnetic recording medium. At present, the on-line capacity of the whole optical recording apparatus, that is, the recording capacity allowable for a simultaneous access, is about the same as that of a magnetic hard disk apparatus. There is therefore a demanded for an optical recording apparatus having a larger on-line capacity.

Heretofore, separately from the development of recording materials, there has been proposed a method in which recorded marks are recorded as closely as possible on the basis of the current bit-by-bit recording method using heat mode recording materials so as to increase the recording density in a surface. For example, a method is known (U.S. Pat. No. 4,569,038) in which the shape of a groove for guiding the light is so designed as to reduce the influence of the reflected light from adjacent tracks, thereby making the pitch of the recording tracks small. With this method, however, the track pitch can be limited to about half of the present pitch at best, and it is impossible to decrease the pitch much more because of an increase of cross-talk. Namely, the capacity can be increased only twice at best.

As another method for increasing the recording density using the conventional recording medium, there is known in general a method in which the wavelength of a laser beam, 80 nm or so at present, is shortened to 70 nm, 60 nm, . . . , for example, or the numerical aperture (N.A.) of an objective lens, about 0.5 at present, is increased to 0.6, 0.7, . . . , for example, so that the size of the recorded marks is reduced to thereby increase the recording density. However, the former method should rely on development of a high power short wavelength semiconductor laser, while the latter method has a problem in that the existing optical recording technique (such as focusing servo), inclusive of the structure of a recording medium and the structure of a recording head, is not applicable as it is in respect of the working distance of the objective lens as well as a considerable decrease in the depth of focus.

In the magnetic hard disk apparatus, the number of recording surfaces available for the simultaneous access is increased by using a recording body comprising a plurality of stacked magnetic recording media and magnetic heads arranged for the respective surfaces, thereby increasing the on-line capacity. In the field of the optical recording apparatus as well, an apparatus of so-called jukebox type has already been commercialized in which a recording medium is taken out according to demand from a stocker storing a plurality of recording media. In this apparatus, however, the on-line capacity is limited by the capacity of a single recording medium, resulting in a problem in that it takes time to achieve access. Further, the apparatus is too large to be built in a personal computer, for example. Namely, assuming that the stacked structure is formed by using the existing optical recording heads and optical recording media, it is difficult to reduce the size of the apparatus, resulting in impracticability. In other words, the conventional optical recording apparatus has a problem in that since the size of the optical recording head is much greater than that of the magnetic recording head, the thickness (height) of the apparatus is inevitably increased to a great extent merely by stacking simply the conventional optical recording media and optical recording heads. Namely, it is difficult to achieve a large capacity due to stacking like the magnetic disk apparatus only by applying the conventional techniques.

SUMMARY OF THE INVENTION

An object of the present invention is to provide an optical recording apparatus which is capable of achieving a large on-line capacity of more than one digit as compared with the conventional apparatus while overcoming various limits encountered in the prior art to increasing the capacity with which the existing optical recording apparatus are confronted as mentioned above.

To this end, in the present invention, a thin recording medium is used in which a substrate constituting a recording medium is formed by a single plate and recording films available for rewriting with a laser beam alone are formed on both sides of the substrate. Further, the thin recording media are stacked to constitute a recording body. In this case, it is preferred to use, in particular, recording media having thin films of a phase change recording material, more particularly, recording media having phase change recording films available for overwriting with a signal laser beam, with each of the recording films being formed on its surface with a transparent protective layer having a thickness of a hundreds $\mu$m at most, more desirably, a thickness of not greater than 100 $\mu$m. The protective layer is mainly made of a dielectric material. It is also effective to form a single recording layer of a mixture of the recording film material and the protective layer material, such as a mixture of a phase change material and a dielectric material. In addition, it is preferred in the present invention that in order to make a simultaneous access to both surfaces of the recording medium, the substrate is formed with continuous spiral grooves or rows of pits each arranged along a spiral line on both surfaces, winding directions of the spirals on the upper and lower surfaces of the medium being opposite to each other. It is preferable that when the recording media are stacked, directions of the spirals on the upper surfaces and on the lower surfaces of the media are the same separately, and directions of the spirals on the upper and lower surfaces of each medium are opposite from each other.

Further, in the present invention, an optical recording head of floating type is used which is separated into a stationary part including a light source of the laser and a photodetector, and a movable part comprising a floating slider, an objective lens and a mirror, only the movable part being arranged on each recording surface. In this case, it is preferred that the N.A. of the objective lens is equal to or greater than 0.6. It is also preferred that the slider, the objective lens and the mirror (prism) are formed into a monoblock body. This facilitates the adjustment of the optical recording head. In addition, the present invention comprises means for rotating the recording medium and the recording body. It is preferred that an example of a means for maintaining constant the floating height of the head is what is called CLV type drive means by which the liner velocity of the head with respect to the rotation of the recording medium is made constant at any position on the recording medium.

It is further preferred that the recording medium, the recording body and the optical recording head are encased as a whole in an air-tight box which is isolated from the external atmosphere.

With the construction described above, it becomes possible to encase the recording body comprising a plurality of stacked optical recording media in a practical size, and it becomes easy to apply an objective lens having a high N.A., thus making it possible to increase the on-line capacity of the optical recording apparatus by more than one digit as compared with the conventional apparatus.

DESCRIPTION OF THE PREFERRED EMBODIMENTS

Figure 1:
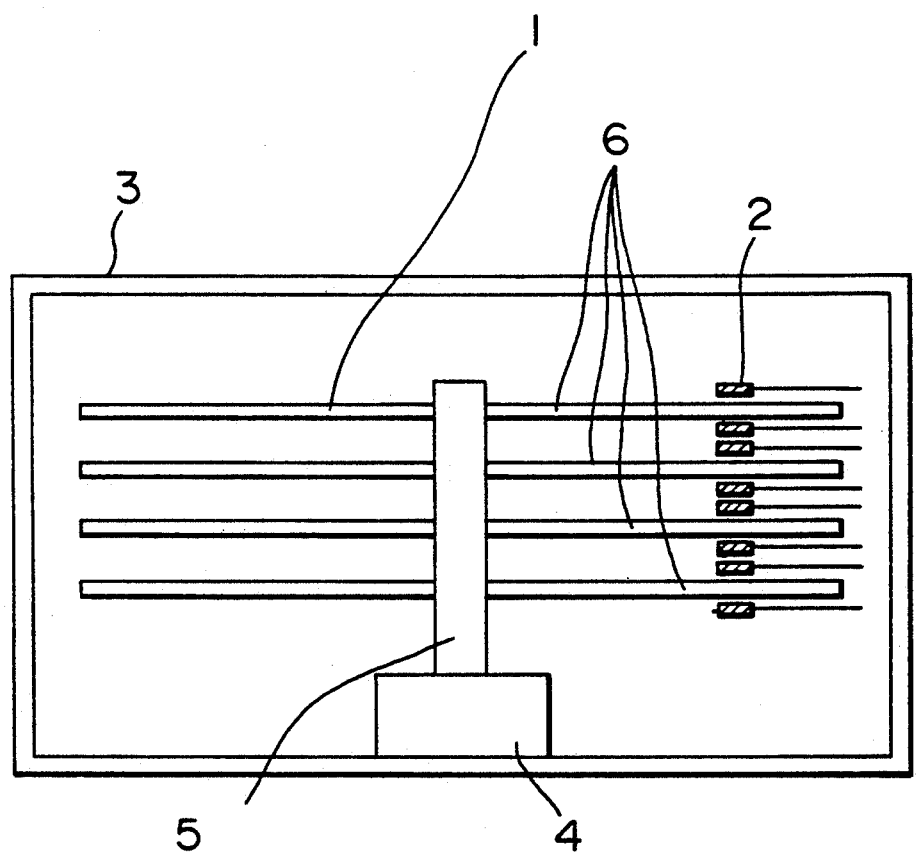
FIG. 1 is a view showing a fundamental construction of an apparatus according to a preferred embodiment of the present invention.

FIG. 1 diagrammatically illustrates the construction of an optical recording apparatus according to a preferred embodiment of the present invention. In this embodiment, optical recording media 1 and optical recording heads 2 are shown as being stacked in order and encased as a whole in an air-tight box 3. Each recording medium comprises a substrate with recording films available for the recording and reproduction of information signals due to irradiation of laser beams and is mounted on a rotary shaft 5 directly connected with a motor 4, as will be described in detail in conjunction with a later-mentioned embodiment. Each recording medium is provided at both sides thereof with thin floating optical heads which are subjected to air resistance upon rotation of the recording medium to float with a specific distance from respective surfaces of the optical recording medium, as will be also described in detail in conjunction with the later-mentioned embodiment.

Each recording medium 1 comprises a substrate formed by a single plate and recording layers formed on the opposite surfaces of the substrate so that recording and reproduction are effected from the side of the recording films of each recording medium. Use of the single plate substrate contributes to reduction of the thickness and the weight per plate of the recording medium. In FIG. 1, a recording body 6 of a stacked structure comprising four recording media 4 and eight optical recording heads 2 is illustrated, and it goes without saying that the recording body can use still more recording media and heads according to practical purposes.

The plate thickness of a substrate used for the recording medium 4 depends on the materials for the substrate. For example, a metallic plate of a thickness as small as about 0.3 mm is applicable. A glass plate or a plastic plate of a thickness of about 0.5 mm at the smallest is also applicable and the largest thickness is only 2 mm or so. The optical recording head is separated into a movable part and a stationary part. Since the movable part has a thickness of only 1 to 4 mm or so and it glides over the recording medium at a height on the order of only hundreds of $\mu$m or so, it scarcely requires any space. Therefore, the distance between adjacent media can be selected to be not greater than 5 mm. Namely, it is possible to equip an apparatus of a standard height (42 mm) called half-height with a recording body of the stacked structure comprising about four to ten recording media and to equip an apparatus of a standard height (84 mm) called full-height with a recording body of the stacked structure comprising about eight to twenty recording media. This permits the capacity of the apparatus to be increased strikingly by more than ten times. Further, by arranging an independent optical recording head for each surface of the recording layer, it becomes possible to make a simultaneous access to the respective surfaces to increase a so-called on-line capacity by more than ten times.

It is preferable that the optical recording apparatus according to the present invention is not affected by an ambient environment such as dust, wind and moisture, for example. It is therefore preferable to use the apparatus as it is encased in the air-tight box for isolation from the external influence described above. The air-tight box is made of a metallic or plastic material and the interior space of the air-tight box is completely isolated from the external atmosphere so that it can be filled with a rare gas such as nitrogen and argon. It is also possible to circulate clean air through a filter. Particularly in the case of the former structure, deterioration of the recording medium due to humidity, oxidation and the like can be diminished, resulting in the increase of the degree of freedom in designing the medium.

Functions of the elements constituting the optical recording apparatus according to the present invention will be described in more detail with reference to FIG. 2A. Although a single recording medium is used in this embodiment, the same explanation as that of this embodiment is equally applicable to other embodiments in which a plurality of recording media are used. An optical recording medium 1, which comprises a substrate 8, recording films 10 formed on the substrate 8 so as to produce optically detectable changes upon irradiation of laser beam 9 and protective layers 11 therefor, is mounted on a rotary shaft 5 directly connected to a motor 4 so that it is rotated with the rotation of the motor 4. Above the opposite surfaces of the optical recording medium 1, movable parts of optical recording heads 2 are arranged. The movable part of each optical recording head 2 is constituted by a slider 12 serving to convert air resistance into a floating force, an objective lens 13 and a mirror 14, and is caused to float from the surface of the recording medium through an air layer of a thickness of several $\mu$m to hundreds of $\mu$m upon the rotation of the recording medium 1. The movable part of the optical recording head 2 is attached to an arm 15 so as to be moved as a whole by a linear motor (not shown) to any arbitrary position on the recording medium 1.

Laser beam 9 is emitted by a semiconductor laser 16 disposed in the stationary part of the optical recording head 2 which is fixed outwardly of the outermost peripheral portion of the recording medium 1, and is made to pass through a lens system 17 to become a parallel laser beam 9 which is incident upon the mirror 14. The laser beam 9 is bent at an angle of 90° by means of the mirror 14 and then is incident substantially perpendicularly to the objective lens 13 so as to be focused on the recording medium 1. In recording, the output power of the semiconductor laser 16 is modulated in accordance with information signals sent from the outside. Recorded marks corresponding to the signals are formed on the recording medium 1. In reproducing the recorded signals, the semiconductor laser 16 makes irradiation at reduced output power. A beam of reflected light from the recording medium 1 is condensed through a λ/4 plate 19, a polarizing beam splitter 18 and a lens 20 which are located in a light path, to a photodetector 21 fixed outwardly of the outermost peripheral portion of the recording medium. The photodetector 21 then reads the change of the output power.

Figure 2A:
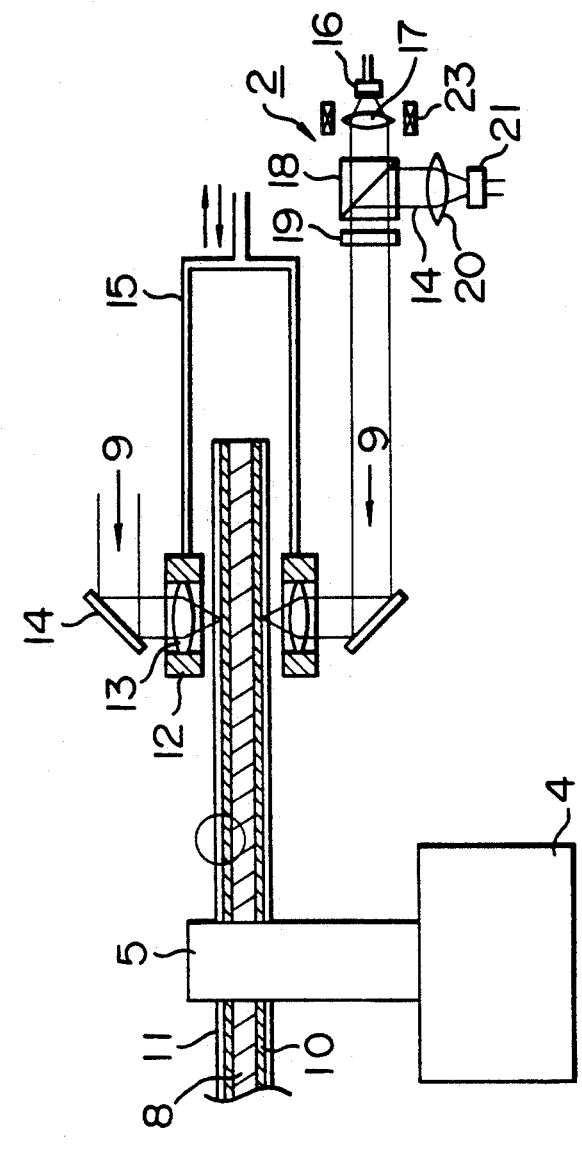
FIG. 2A is a fragmentary side view showing details of an optical recording apparatus according to the present invention.
Figure 2B:
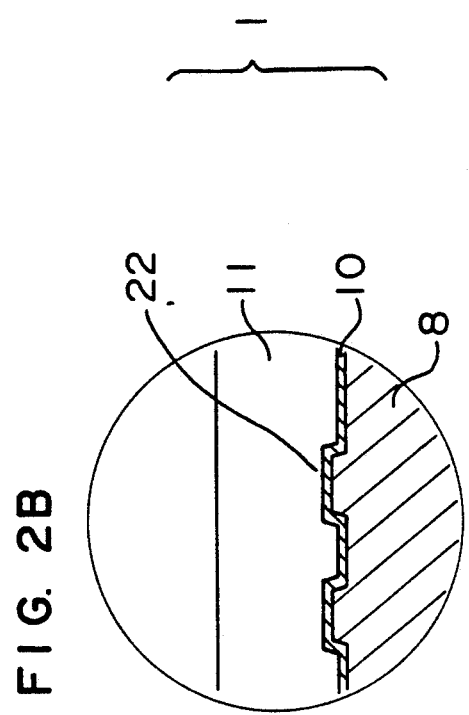
FIG. 2B is a view showing a recording medium constituting the optical recording apparatus according to the present invention.

FIG. 2B shows the structure of the recording medium which constitutes part of the optical recording apparatus according to the present invention. The substrate 1 is formed on the surfaces thereof with continuous spiral grooves 22 for the purpose of effecting the tracking of recording and reproducing beams at the time of recording and reproduction. The winding directions of the spiral grooves in the upper and lower surfaces of the recording medium 1 are opposite from each other for permitting simultaneous access to the both surfaces. Accordingly, when the recording medium 1 is rotated, the optical recording heads 2 on the opposite sides are moved in the same direction, thus facilitating the simultaneous access to the upper and lower surfaces of the single recording medium 1, for example. Namely, two optical recording heads 2 respectively for the upper surface use and for the lower surface use are mounted on a common arm 15 so as to be able to make access to the corresponding positions on the upper and lower surfaces of the recording medium. In case the recording mediums 1 are stacked, all of the optical recording heads 2 are able to easily make simultaneous access to the corresponding positions on all recording medium surfaces by mounting a plurality of arms on a common shifting means, for example.

In practical application, if every recording surface is provided at the outer peripheral portion thereof with a directory area of the recorded data, it becomes possible to search them simultaneously to facilitate the recording and reproducing of the data. In this case, two sets of shifting means may be provided to make access independently to the upper and lower surfaces of the recording media. In this case, the upper and lower surfaces of the recording medium are formed with left-hand and right-hand spiral grooves, respectively (the reverse combination is also applicable). As an alternative means for guiding the laser beam, concentric circular grooves or a row of signal pits arranged along a spiral line may be formed previously. However, the spiral groove is preferable because of its high pitch accuracy in groove formatting.

The recording medium 1 is fixedly mounted on the rotary shaft 5 with a metallic hub, for example, attached to the center thereof. The rotary shaft 5 is connected to the motor 4. The recording medium 1 is rotated with the rotation of the motor 4. Rotation of the recording medium 1 causes the movable part of the optical recording head 2 to float from and along the surface of the recording medium 1. The optical recording head floats high when the relative velocity of the recording medium 1 with respect to the optical recording head 2 is high and it floats low when the relative velocity is low. It is found that a floating height of about 2 to 3 μm can be obtained at a linear velocity of about 5 m/s. If the objective lens 13 is previously adjusted in height in such a manner that a focal plane of the objective lens 13 coincides with the recording film surface, the laser beam can be focused on the recording layer 10 without requiring any accurate focus servo control. If the floating height is selected depending upon a design of the slider 12, the distance between the objective lens 13 and the surface of the recording medium 1 can be set at about several μm at the smallest, so that it is possible to use a lens, the focal length of which is short. For example, it becomes possible to use an objective lens of a numerical aperture of 0.6 to 0.9 in place of the conventional lens of the numerical aperture of about 0.5, thus improving the recording density as well.

In case a so-called CAV method is chosen in which the rotational number of the recording medium 1 is made constant, the relative velocity of the optical recording head 2 with respect to the recording medium surface varies depending on the position, and, hence, the floating height is varied correspondingly as well. In case a change in the height exceeds the depth of focus of the objective lens 13, it is required to make a focus servo control so as to change the divergence angle of the laser beam 9 in accordance with the result of detection of the quantity of the reflected light 14. This can be achieved by, for example, changing the distance between semiconductor laser 16 and a collimating lens 17 which are located in the stationary part of the optical recording head. Namely, when recording is effected onto the outer peripheral portion of the recording medium 1, the collimating lens 17 is kept away from the semiconductor laser 16 so that the semiconductor laser 16 is located slightly outwardly of the focal plane of the lens 17. The laser beam 9 is incident to the objective lens 8 with a tendency to somewhat diverge, so that the focal point is made distant. On the other hand, when recording is effected onto the inner peripheral portion, the collimating lens 17 is moved close to the semiconductor laser 16, so that the semiconductor laser 16 is located slightly inwardly of the focal plane of the lens 17. The laser beam 9 is incident to the objective lens 13 with a tendency to somewhat converge, so that the focal point is made close. The lens can be moved by an ordinary lens driving method such as one, for example, in which the lens is attached to an actuator 23 using a voice coil or the like.

In case a CLV method is chosen in which the rotational speed of the motor 4 is varied depending upon the position of the recording medium, the floating height is made constant but it is required to provide a position detecting means. For example, the head is made to wobble left and right with respect to the groove for guiding the laser beam at frequencies depending upon the positions so that the detected frequency is fed back to the motor driver.

Figures 3A, 3B:
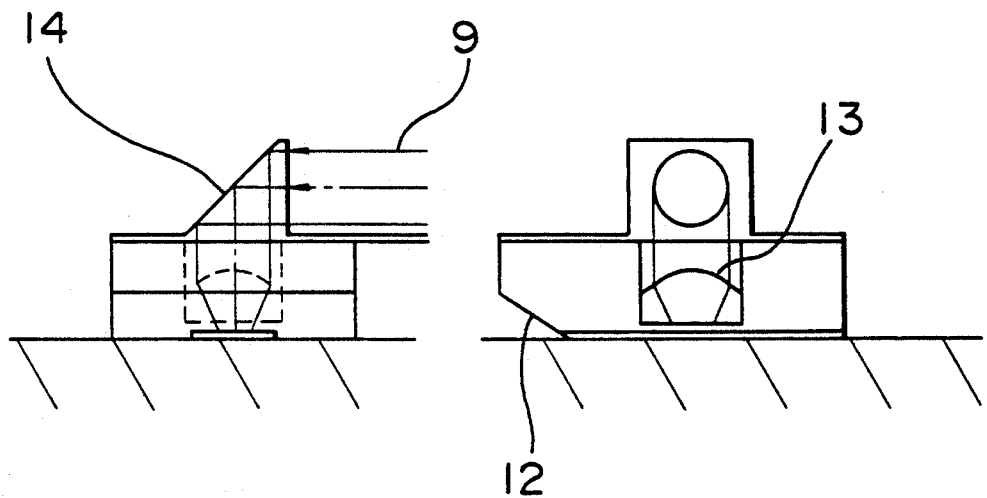
FIGS. 3A to 3C are a side view, a front view and a plan view, respectively, showing a movable part of an optical recording head of the optical recording apparatus according to the present invention.
Figure 3C:
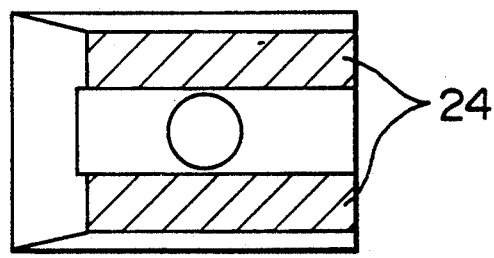

The slider 12 can be made of a material which is available for a flying head used in magnetic recording, such as Mn-Zn ferrite, on condition that it has a sufficient hardness and is not overly heavy. In this case, the accuracy with which the slider, the mirror and the objective lens 13 are attached is important. For example, if the objective lens is inclined with respect to the slider, the focal point is changed. FIGS. 3A to 3C illustrate an example of the structure of the optical recording head 2 which is one of the important technical elements of the present invention. The slider 12, the objective lens 13 and the mirror 14 are made of the same material. Namely, by forming the objective lens 13, the mirror 14 and the slider 12 as a monoblock body according to the predetermined dimensions, a problem can be solved with respect to how to ensure a high accuracy of attaching the objective lens 13 to the slider 12. Glass and plastic are available as the material. In case of using a material which is relatively susceptible to wear such as plastic, a wear-resisting layer 24 such as a DLC film may be formed on the surface of the slider portion. The mirror 14 can be replaced by a prism which functions to permit the incident light 9 to be transmitted to the objective lens 13 as efficiently as possible.

In FIGS. 1 and 2A, a tracking mechanism, a transporting mechanism for the recording medium, an electric circuit and the like which are inevitably needed as constituents of the optical recording apparatus are omitted; it goes without saying that these mechanisms and circuits are inherently necessary elements of the apparatus.

Next, description will be given in more detail of the recording medium 1 constituting the present invention. In the present invention, since the floating head is used as the optical recording head 2, it is important as a characteristic of the substrate 8 that the surface is optically smooth and that its susceptibility to warp, distortion and the like is minimized. For example, the amount of warp is preferably equal to or smaller than 50 $\mu$m at the largest. It is therefore preferable to use a sheet of amorphous polyolefin among sheets of PMMA, polycarbonate, vinyl chloride, amorphous polyolefin and the like which are ordinarily used as an optical recording medium. More preferably, a sheet glass or a metallic sheet such as sheets of copper, aluminum, nickel or the like can be used. From the point of view of the possibility of forming the groove 22 directly on the surface of the substrate, the sheet glass is superior to the metallic sheet. In case of the metallic sheet, the groove 22 is formed by the 2P method, for example.

It is preferred that the recording film 10 used in the optical recording apparatus according to the present invention is made of a phase change material in particular. On the other hand, such type of material for a recording film is not suitable, a portion of which is evaporated or removed by the irradiation of the laser beam to form holes thereat. This is because the recording film of the type which is formed with the holes cannot be covered with a solid protective layer 11 from the viewpoint of the recording mechanism. Namely, in the optical recording apparatus according to the present invention, since the laser beam 9 is incident from the side of the recording film 10 of the optical recording medium 1, there is a good change that the optical recording head 2 will come into contact with the recording film 10, and, assuming that the optical recording head 2 comes into contact with the recording film 10, the recorded data will be easily lost but for the presence of the protective layer 11. Further since the distance between the surface of the recording medium and the optical recording head is made very small, it is hard to avoid such influence that the evaporated material is apt to contaminate the optical system. It is preferred that the recording film applied to the present invention does not involve any deformation of the material and any great material transfer and is capable of being provided with the protective layer in close contact therewith, and particularly, a film of a phase change material is excellent.

The recording medium, to which a constitution using a protective layer in close contact therewith can be applied, may be made of a photomagnetic recording material in addition to the phase change material. However, in case of photomagnetic recording, an "auxiliary magnetic field generating coil" for generating a large magnetic field is required in addition to the optical recording head in order to effect recording and reproduction, this resulting in a large optical recording head. Further, although there are known several proposals for an overwriting method, a method using the modulation of the magnetic head requires an optical head and a magnetic head which are opposed to the upper and lower sides of the recording medium, resulting in that both surfaces of the medium cannot be used simultaneously for structural reasons. Further, a method using such a recording medium that comprises two stacked recording layers of different characteristics requires a large magnet in addition to the recording head, thus making it difficult to reduce the overall height. Namely, this is not suitable for the object of the present invention which is directed to stacking the recording media. After all, in view of the above, the phase change medium is the most suitable for the recording medium used in the optical recording apparatus according to the present invention. In case of the phase change recording medium, since it is possible to overwrite by means of the optical recording head alone, the apparatus can be made thin even with use of the stacked recording media.

The protective layer 11 formed on the recording layer 20 can be formed by a film of oxide, nitride, sulfide, selenate, carbide or a mixture of them which has been applied to the conventional recording media. It is preferable to use a film of high hardness such as a DLC (diamond-like carbon) film, a c-BN (cubic boron nitride) and TiN (titanium nitride) film. The protective layer was required experimentally to have a thickness of about 50 nm. A thickness smaller than 50 nm resulted in breakage of the recording layer due to contact with the head irrespective of the material of the protective layer. In order to assure the optical smoothness of the surface of the recording medium which is formed with the protective layer, it is simple and convenient to form the layer by means of vacuum evaporation, CVD, sputtering or the like. However, the thicker the protective layer, the larger the strain that will develop due to internal stresses to produce cracks, and therefore, it is preferred to set the thickness in a range from 0.1 $\mu$m to about 100 $\mu$m at the most. It is effective as well to further protect the surface by forming on the protective layer a layer of resin such as ultraviolet-setting resin by means of a spin coat or the like. On the other hand, the upper limit of the film thickness of the protective layer depends on the size (effective diameter) and the N.A. of the objective lens. For example, when the effective diameter and the N.A. of a lens which can be loaded on the floating optical head used in the present invention are about 1 mm, in practice, and about 0.5 to 0.9, respectively, the working distance of the objective lens is on the order of about hundreds of $\mu$m at most. Accordingly, in order to focus the laser beam to the recording film layer, the thickness of the protective layer including the thickness of the spin-coated resinous layer is set at hundreds of $\mu$m at most. As the N.A. is further increased, the working distance is further decreased, so that the thickness of the protective layer as well is further reduced correspondingly. The thickness of the protective layer is preferably equal to or smaller than 100 $\mu$m, more preferably, equal to or smaller than 10 $\mu$m to facilitate the lens planning.

Figure 4A:
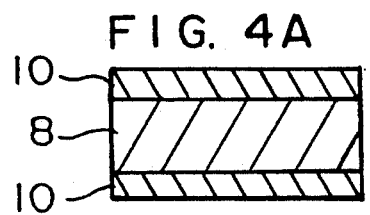
FIGS. 4A to 4H, 4J to 4N and 4P to 4R are views showing various examples of a recording medium applicable to the optical recording apparatus according to the present invention.
Figure 4B:
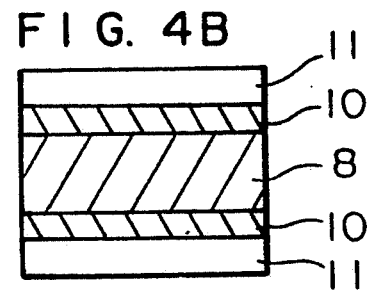
Figure 4C:
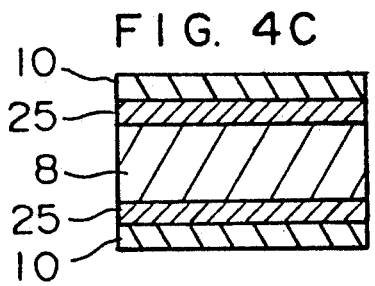
Figure 4D:
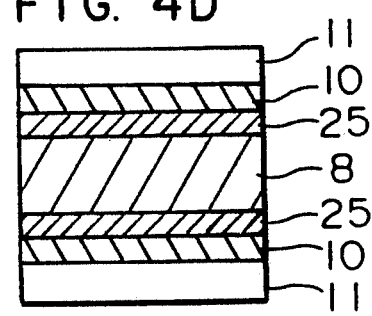
Figure 4E:
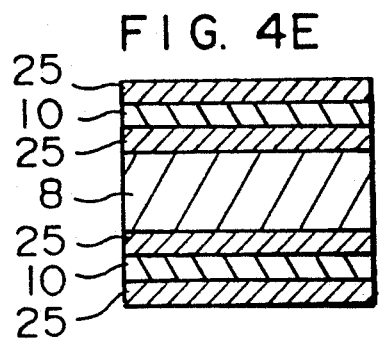
Figure 4F:
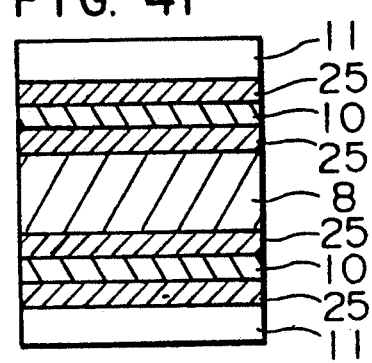
Figure 4G:
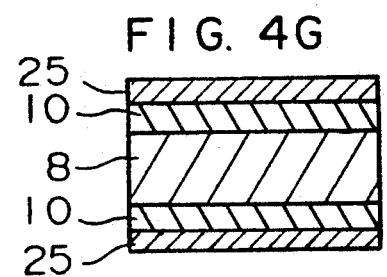
Figure 4H:
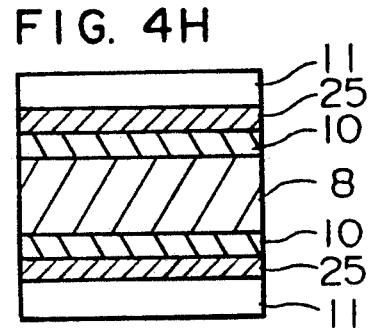
Figure 4J:
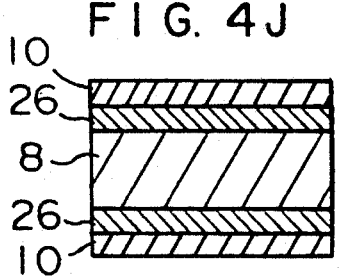
Figure 4K:
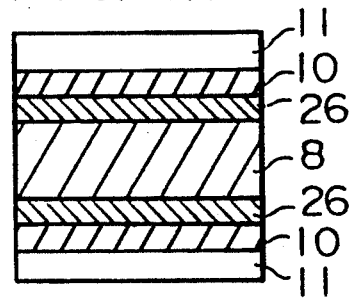
Figure 4L:
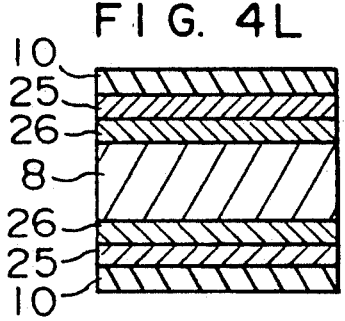
Figure 4M:
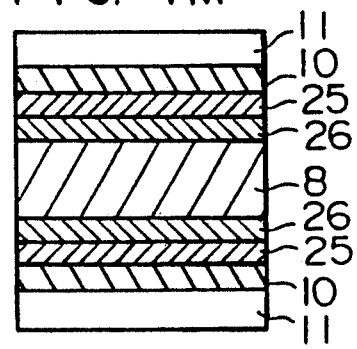
Figure 4N:
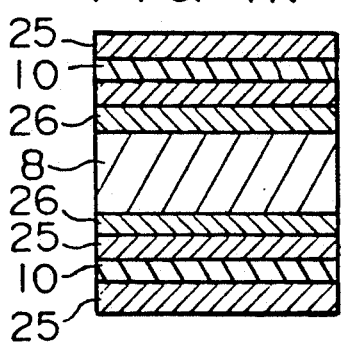
Figure 4P:
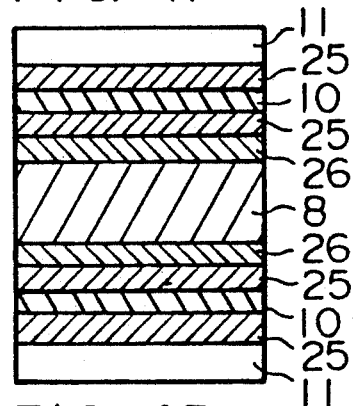
Figure 4Q:
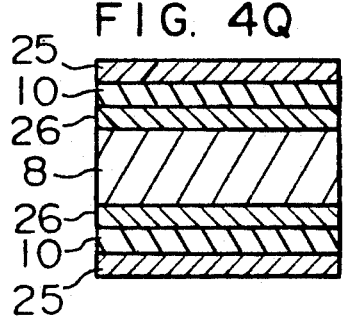
Figure 4R:
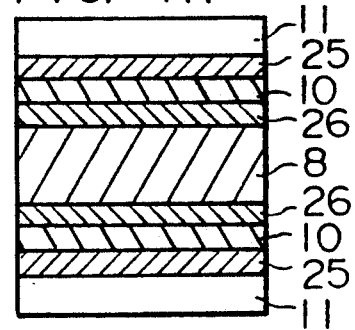

FIGS. 4A to 4R illustrate more practical examples of the recording medium 4 used in the recording apparatus of the present invention. Throughout the examples, the same patterns are used to indicate equivalent constituents. FIG. 4A illustrates the simplest structure in which only the recording layers 10 are formed on the opposite surfaces of the substrate 8. The recording layer is a thin film of a recording material which produces phase changes between an amorphous phase and a crystalline phase or between a crystalline phase and another crystalline phase, for example, in accordance with laser irradiation conditions, such as a thin film of Te-base or Se-base materials including Ge-Te, Ge-Te-Sn, Ge-Te-Sb, Ge-Te-Bi, Ge-Te-Sn-Au, Ge-Se-Te, Sb-Se, Sb-Se-Te, In-Te, Sb-Te, In-Se, In-Sb-Te, In-Sb-Se, In-Se-Tl, In-Se-Tl-Co, Ga-Te-Se, Pd-Te-Ge-Sb, Te-Ge-Sb-Co, Te-0-Ge-Sn, Te-0-Ge-Sn-Au and In-Te-Au, a thin film of Sb-base materials including Ga-Sb, In-Sb, Au-Sb, Ge-Sb, Cu-Sb, Bi-Sb, Zn-Sb and Ag-Sb, and a thin film which utilizes the change in the reflectivity between a high temperature phase and a low temperature phase of a metal such as Ag-Zn alloy, attributable to the change in the band structure. In particular, as a film material available for the overwriting with a single laser beam, there are materials of GeTe system, GeSbTe system, InSbTe system, InSeTlCo system, Ge-Sb-Te-Co system, Pd-Ge-Sb-Te system, SbSe system and GaSb system and especially the GeSbTe system, exhibit the desirable applicability.

FIG. 4C illustrates a structure in which there are formed between the substrate 8 and the respective recording layers 10, layers of a material with higher melting point than the recording layers 10, such as dielectric layers 25. FIG. 4E illustrates a structure in which the same dielectric layers 25 are formed on the opposite sides of each of the recording layers 10. FIG. 4G illustrates a structure in which the dielectric layers 25 are formed on the surfaces of the recording layers 10 alone. In case some layer is further laminated on the recording layers 10, it is required to be transparent to the light used. The dielectric layer 25 functions, by selecting properly the film thickness thereof, to optimize an amount of optical change between before and after the recording such as the reflectivity, the absorption factor and the like, and it can be formed by a film of an oxide such as $SiO_2$, $TiO_2$, $Al_2O_3$, $ZrO_2$ and $GeO_2$, a nitride such as AlN, TiN, SiN, ZrN and BN, or a chalcogenide such as ZnS and ZnSe, or by a DLC film mentioned before. In case a sufficient recording sensitivity cannot be obtained, a layer of a material of a low heat conductivity is formed between the recording layer 10 and the substrate 8 to suppress the diffusion of heat to the substrate. For example, a layer of a resin such as polystyrene is formed by means of the spin coat or the like method.

FIG. 4J illustrates a structure in which a reflective layer 26 is formed between the substrate 8 and each of the recording layers 10, and FIG. 4Q illustrates a structure in which the dielectric layers 25 are formed on the surfaces of the recording medium shown in FIG. 4J. The reflective layer 26 functions to improve the light absorption factor of the recording layer 10, and it can be formed by a film of a simple metal such as Al, Au, Pd, Cu, Ti, Ni, Cr, Ge, Si, Fe, Sb, Sn, Ta and W or a film of an alloy of these metals.

FIG. 4L illustrates a structure in which the dielectric layers 25 are interposed between the reflective layers 26 and the recording layers 10. FIG. 4N illustrates a structure in which the dielectric layers 25 are further formed on the surfaces of the recording layers 10 of the recording medium shown in FIG. 4L. Provision of the dielectric layer 25 between the recording layer 10 and the reflective layer 26 makes it possible to change the distance between the recording layer 10 and the reflective layer 26, so that it is possible to control the diffusion rate of heat from the recording layer 10 to the reflective layer 26. Therefore, it becomes possible to optimize the thermal characteristics as well as the optical characteristics.

FIGS. 4B, 4D, 4F, 4H, 4K, 4M, 4P and 4R illustrate structures in which the protective layers 11 are formed in the structures shown in FIGS. 4A, 4C, 4E, 4G, 4J, 4L, 4N and 4Q, respectively.

Figure 5:
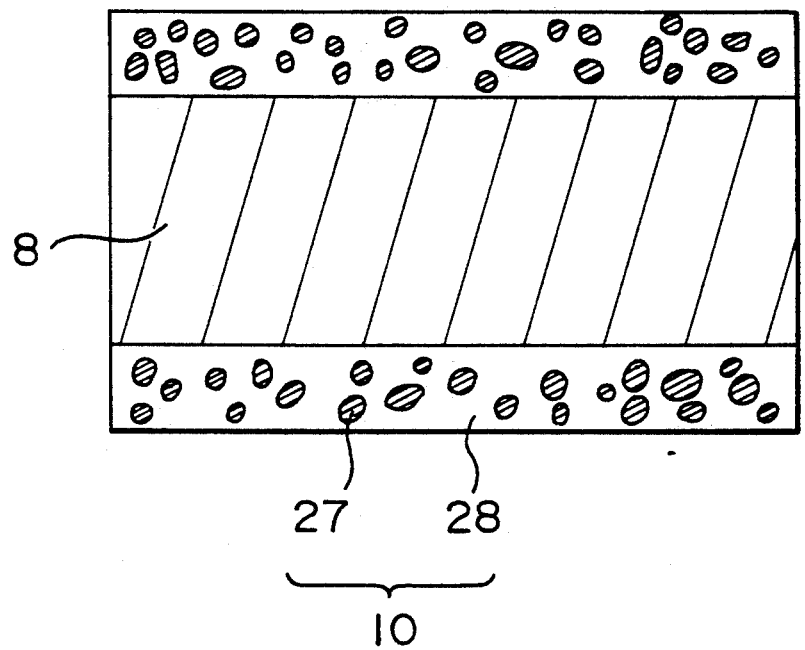
FIG. 5 is a view showing the matrix structure of a recording layer.

The recording layer can be formed in a so-called matrix structure as well. FIG. 5 shows the outline of the matrix structure.

More specifically, a first material 27, such as the above-mentioned phase change material, adapted for reversible change or irreversible change between a plurality of detectable states upon the change of laser irradiation conditions, is scattered as fine particles into a second material 28, which is optically transparent and has a higher melting point than the first material, to provide an information recording thin film as a thin recording film in the structure shown in FIG. 5. The first material substantially contributing to the recording of information is blocked in the second material of the higher melting point, so that it is possible to isolate the first material from the external atmosphere without using any special protective layer. The thickness is about 500 nm at the most. It is of course possible as well to add the protective layers, the wear-resisting layers, the reflective layers and the dielectric layers illustrated and described in connection with the above embodiments. In this embodiment, the aforesaid phase change material is particularly useful as the first material 27 forming the recording layer from the several points of view that it is not accompanied with any shape change in recording, that the opposite surfaces can be used simultaneously, and that the same effects as those of a homogeneous body can be expected even if scattered in the other material. The second material 28 in which the phase change material is scattered is selected from the group of materials which have a melting point higher than that of the first material 27 and have a high boiling point, and which are optically transparent to the wavelength of the light source in use and are of high hardness. Considering that the melting point of the first material 27 is 800° C. at the most, the melting point of the second material 27 should be set at a temperature higher than 800° C., and the following materials are usable. Namely, an oxide such as $SiO_2$, $TiO_2$, $Al_2O_3$, $ZrO_2$, $GeO_2$ and $Ta_2O_5$, a nitride such as AlN, SiN, TiN, ZrN and BN, a chalcogenide such as ZnS and ZnSe, a carbide such as SiC, a DLC (diamond-like carbon) film, a cBN (cubic boron nitride) film, and a mixture of the above materials such as ZnS-SiO$_2$ system can be used.

More practical embodiments of the present invention will be described below.

Embodiment 1

The recording medium section had a stacked structure of five layers. Each substrate was formed by a sheet glass of 130 mm diameter and 1 mm thickness, and tracking grooves with a depth of 72 nm and a width of 0.6 $\mu$m were formed spirally in the opposite surfaces thereof at a pitch of 1.5 $\mu$m. Winding directions of the spirals on the upper and lower surfaces of the substrate were made opposite from each other. This facilitates the parallel access to the upper and lower surfaces of each medium. Each of the recording layers was formed by a material composed of fine particles of Sb$_2$Te$_3$ as the first material scattered in a mixture of ZnS and SiO$_2$ as the second material, the volumes of the first and second materials being in the ratio 50%:50%. The sputtering was carried out in an atmosphere of argon gas with sheets of Sb$_2$Te$_3$ arranged on a target of ZnS-SiO$_2$, thereby forming a film of about 2100 nm thickness. The recording film was formed in the amorphous state. The recording media were fixedly mounted on the rotary shaft of the motor with screws leaving a distance of 4 mm between adjacent surfaces so as to constitute a five-layer and ten-surface stacked recording medium section. An optical recording head constituted by a slider, an objective lens of 0.6 N.A. and a deflection prism was arranged above each recording surface. A laser diode of the wavelength of 780 nm was used as the light source. A compact recording apparatus was realized with an overall thickness of only 25 mm. The capacity was increased by at least more than ten times that of the conventional apparatus, comparing in regard to the number of the recording surfaces. As the motor connected to the recording medium section was rotated at a speed of 1800 rpm, each head floated to a height of about 20 $\mu$m (at a position corresponding to the recording diameter of 100 mm) to carry out the recording, reproducing and rewriting operations through the procedure described as follows:

1) A laser beam was irradiated continuously to the recording surface at an output power of 20 mW. As a result, the irradiated portion was caused to crystallize to form a track of high reflection factor.

2) A laser beam was irradiated to the track of the increased reflectivity while being modulated at a frequency of 5 MHz between 20 mW and 10 mW. As a result, the portion irradiated at the higher output power was changed into the amorphous state to reduce the reflectivity thereof, thus effecting the recording. The recorded portion was reproduced by an irradiation of a laser beam at an output power of 1 mW. As a result, a reproduced signal of 50 dB of c/N was obtained.

3) A laser beam was irradiated to the above mentioned recorded track while being modulated at a frequency of 2 MHz between 20 mW and 10 mW. As a result, the portion irradiated at the higher output power was likewise changed into the amorphous state to reduce the reflectivity thereof, but the portion irradiated at the lower output power was caused to crystallize to increase the reflectivity thereof, thus effecting the rewriting of information. The rewritten portion was reproduced by an irradiation of a laser beam at an output power of 1 mW. As a result, it was confirmed that a signal component of 5 MHz was reduced by 30 dB and a signal component of 2 MHz was recorded at 50 dB of c/N.

Embodiment 2

An apparatus was prepared in which the recording apparatus described in connection with Embodiment 1 was encased in an air-tight box. The air-tight box was filled with a nitrogen gas. This apparatus was kept in an environment of a temperature of 80° C. and a relative humidity of 80% together with the apparatus of Embodiment 1, and rewriting tests were conducted every hundred hours. As a result, it was confirmed that the apparatus of Embodiment 2 could carry out quite the same recording, reproducing and rewriting operations even five thousand hours later, in contrast to the apparatus of Embodiment 1 in which the CN ratio was somewhat lowered in the rewriting operation effected two thousand hours later. For the comparison with the present invention, an apparatus was produced by way of experiment in which recording layers of the recording media were each formed by a homogeneous layer of Sb$_2$Te$_3$, and the same tests were conducted. As a result, characteristics were deteriorated only about five hundred hours later.

Embodiment 3

The recording medium section had a stacked structure of five layers. Each substrate was formed by a sheet glass of 130 mm diameter and 1 mm thickness, and tracking grooves with a depth of 72 nm and a width of 0.5 $\mu$m were formed spirally on the opposite surfaces thereof at a pitch of 1.2 $\mu$m. Winding directions of the spirals on the upper and lower surfaces of the substrate were made opposite from each other. Each recording medium was formed by piling on the substrate in order an Au reflective layer of 50 nm thickness, a ZnS-SiO$_2$ dielectric layer of 100 nm thickness, a Ge$_{21}$Sb$_{25}$Te$_{54}$ recording layer of 20 nm thickness, and a ZnS-SiO$_2$ dielectric layer of 200 nm thickness, and a DLC protective layer of 5 $\mu$m was further formed thereon. The reflective layer, the dielectric layer and the recording layer were formed by means of sputtering in an atmosphere of argon gas. The protective layer was formed by means of a plasma ECR method. The recording film was formed in the amorphous state. The recording mediums were fixedly mounted on the rotary shaft of the motor with screws leaving a distance of 3 mm between adjacent surfaces to constitute a five-layer and ten-surface stacked recording medium section. An optical recording head constituted by a slider, an objective lens of 0.75 N.A. and a deflection prism was arranged above each recording surface. A laser diode of the wavelength of 780 nm was used as a light source. A compact recording apparatus was realized with an overall thickness of only 40 mm in the state that the whole was encased in an air-tight box of stainless steel. The recording capacity per surface was 1.5 GByte, so that the recording capacity of the apparatus was 15 GByte, thus making it possible to increase the on-line capacity much more than ten times that of the conventional apparatus. As the motor connected to the recording medium section was rotated at a speed of 3600 rpm, each head floated to a height of about 30 $\mu$m (at a position corresponding to the recording diameter of 100 mm) to carry out the recording, reproducing and rewriting operations on the ten surfaces simultaneously through the procedure described as follows:

1) A laser beam was irradiated continuously to every recording surface at an output owner of 10 mW. As a result, the irradiated portion was crystallized to form a track of high reflectivity.

2) A laser beam was irradiated to the track of the increased reflectivity while being modulated at a frequency of 10 MHz between 20 mW and 10 mW. As a result, the portion irradiated at the higher output power was changed into the amorphous state to reduce the reflectivity thereof, thus effecting recording. The recorded portion was reproduced by an irradiation of a laser beam at an output power of 2 mW. As a result, a reproduced signal of a CN ratio of 55 dB was obtained.

3) A laser beam was irradiated to the recorded track while being modulated at a frequency of 7 MHz between 20 mW and 10 mW. As a result, the portion irradiated at the higher output power was likewise changed into the amorphous state to reduce the reflectivity thereof, but the portion irradiated at the lower output power was crystallized to increase the reflectivity thereof, thus effecting the rewriting of information. The rewritten portion was reproduced by an irradiation of a laser beam at an output power of 2 mW. As a result, it was confirmed that a signal component of 10 MHz was reduced by 35 dB to be erased and a signal component of 7 MHz was recorded at a CN ratio of 55 dB.

Embodiment 4

Recording of an NTSC digital video signal using the optical recording apparatus of Embodiment 3 was made. An NTSC digital signal of 120 Mbps was divided into ten channels and recorded in parallel on every recording surface. As a result, it was confirmed that the video signal could be recorded.

Embodiment 5

The recording medium section had a stacked structure of ten layers. Every substrate was formed by an aluminum sheet of 86 mm diameter and 0.5 mm thickness, and tracking grooves with a depth of 72 nm and a width of 0.5 $\mu$m were formed spirally in the opposite surfaces thereof at a pitch of 1.2 $\mu$m. Winding directions of the spirals on the upper and lower surfaces of the substrate were made opposite from each other. Each of the recording layers was formed by piling in order a ZnS-SiO$_2$ mixture film of 100 nm thickness, a Ge$_{21}$Sb$_{2.5}$Te$_{54}$ film of 20 nm thickness and a ZnS-SiO$_2$ mixture film of 200 nm thickness, and a DLC protective layer of 5 $\mu$m thickness was further formed thereon. The respective layers of the recording layer were formed by means of sputtering in an atmosphere of argon gas. The protective layer was formed by means of a plasma ECR method. The recording film was formed in the amorphous state. The recording media were fixedly mounted on the rotary shaft of the motor with screws leaving a distance of 3 mm between adjacent surfaces to constitute a ten-layer and twenty-surface stacked recording medium section. An optical recording head constituted by a slider, an objective lens of 0.75 N.A. and a deflection prism was arranged above each recording surface. A laser diode of the wavelength of 780 nm was used as a light source. A compact recording apparatus was realized with an overall thickness of only 40 mm in the state wherein the whole was encased in an air-tight box of stainless steel. The recording capacity surface was 200 MByte, so that the recording capacity of the apparatus was 4 GByte, thus making it possible to increase the on-line capacity by much more than ten times that of the conventional apparatus. As the motor connected to the recording medium section was rotated at a speed of 2400 rpm, each head floated to a height of about 15 $\mu$m (at a position corresponding to the recording diameter of 60 mm) to carry out the recording, reproducing and rewriting operations through the procedure described as follows:

1) A laser beam was irradiated continuously to the recording surface at an output power of 8 mW. As a result, the irradiated portion was crystallized to form a track of high reflectivity.

2) A laser beam was irradiated to the track of the increased reflectivity while being modulated at a frequency of 5 MHz between 15 mW and 8 mW. As a result, the portion irradiated at the higher output power was changed into the amorphous state to reduce the reflectivity thereof, thus effecting the recording. The recorded portion was reproduced by an irradiation of a layer beam at an output power of 1 mW. As a result, a reproduced signal of a CN ratio of 50 dB was obtained.

3) A laser beam was irradiated to the recorded track while being modulated at a frequency of 2 MHz between 15 mW and 8 mW. As a result, the portion irradiated at the higher output power was likewise changed into the amorphous state to reduce the reflection factor thereof, but the portion irradiated at the lower output power was crystallized to increase the reflectivity thereof, thus effecting the rewriting of information. The rewritten portion was reproduced by an irradiation of a laser beam at an output power of 1 mW. As a result, it was confirmed that a signal component of 5 MHz was reduced by 35 dB and a signal component of 2 MHz was recorded at a CN ratio of 50 dB.

Embodiment 6

The recording medium section had a single recording medium. The substrate was formed by an amorphous polyolefin sheet of 130 mm diameter and 1.5 mm thickness, and tracking grooves with a depth of 72 nm and a width of 0.5 $\mu$m were formed spirally in the opposite surfaces thereof at a pitch of 1.2 $\mu$m. Winding directions of the spirals on the upper and lower surfaces of the substrate were made opposite from each other. Each recording layer was formed by stacking in order a ZnS film of 100 nm thickness, a Ge$_2$Sb$_2$Te$_5$ film of 20 nm thickness, a ZnS film of 200 nm thickness and an Au film of 50 nm thickness. A DLC protective layer of 5 $\mu$m thickness was further formed thereon. The respective layers of the recording layer were formed by means of sputtering in an atmosphere of argon gas. The protective layer was formed by means of a plasma ECR method. The recording film was formed in the amorphous state. An optical recording head constituted by a slider, an objective lens of 0.75 N.A. and a deflection prisms was arranged above each recording surface. A laser diode of the wavelength of 780 nm was used as a light source. A very compact recording apparatus was realized with an overall thickness of only 10 mm in the state wherein the whole was encased in an air-tight box of stainless steel. The recording capacity per surface was 1 GByte, so that the recording capacity of the apparatus was 2 GByte. As the motor connected to the recording medium section was rotated at a speed of 2400 rpm, each head floated to a height of about 25 $\mu$m (at a position corresponding to the recording diameter of 60 mm) to carry out the recording, reproducing and rewriting operations through the same procedure as that described in connection with Embodiments 1 and 3.

As has been described above, according to the present invention, it is possible to realize an optical recording apparatus, the recording and on-line capacities of which are increased by more than ten times as compared with the conventional optical recording apparatus of the same size.

What is claimed is:

1. An optical recording apparatus comprising:
   (a) an optical recording body comprising plural stacked optical recording media each comprising a single plate substrate and overwritable thin recording films which are formed on opposite surfaces of said substrate, each surface of said substrate having a continuous groove or a row of signal pits arranged along a spiral line so as to guide a laser beam, serving as recording and reproducing means, to a desired position, directions of the spiral lines of the opposite surfaces of said substrate being opposite to each other, wherein said single laser beam is used to produce optically detectable phase changes between plural states corresponding to irradiating conditions of the laser beam, said single laser beam being used to perform recording and reproducing on said recording films, said plural stacked optical recording media being stacked such that a distance between opposed surfaces of adjacent recording media is 5 mm or less; and directions of the spiral lines on likewise facing surfaces of the plural recording media being the same as each other;
   (b) means for rotating said recording body; and
   (c) a plurality of floating type optical heads which are respectively provided adjacent both sides of said optical recording media and each of which comprises a movable part and a stationary part, said movable part comprising (i) a slider, (ii) one of a mirror or a prism, and (iii) an objective lens, said slider being subjected to resistance of surrounding air upon the rotation of said recording media in a predetermined direction to convert said resistance into a gliding force thereby causing the movable part to glide relative to the respective surfaces of said recording media at a predetermined distance therefrom, said mirror or said prism serving to deviate at an angle of 90 degrees a laser beam emanating from said stationary part, said objective lens serving to focus said laser beam from said mirror or said prism onto said recording media, and whereby said laser beam is irradiated on respective recording surfaces of said recording body for recording and reproducing of information signals.

2. An optical recording apparatus comprising:
   (a) an optical recording body comprising an optical recording medium comprising a single plate substrate and overwritable thin recording films which are formed on opposite surfaces of said substrate, wherein a single laser beam is used to produce optically detectable phase changes between plural states corresponding to irradiating conditions of the laser beam, said single laser beam being used to perform recording and reproducing on said recording films; each surface of said substrate having a continuous groove or a row of signal pits arranged along a spiral line so as to guide said laser beam, serving as recording and reproducing means, to a desired position, directions of the spiral lines on oppositely facing surfaces of said optical recording media being opposite to each other;
   (b) means for rotating said recording body; and
   (c) a plurality of floating type optical heads which are respectively provided adjacent both sides of said optical recording medium and each of which comprises a movable part and a stationary part, said movable part comprising (i) a slider, (ii) one of a mirror or a prism, and (iii) an objective lens, said slider being subjected to resistance of surrounding air upon the rotation of said recording media in a predetermined direction to convert said resistance into a sliding force thereby causing the movable part to glide relative to the respective surfaces of said recording media at a predetermined distance therefrom, said mirror or said prism serving to deviate at an angle of 90 degrees a laser beam emanating from said stationary part, said objective lens serving to focus said laser beam from said mirror or said prism onto said recording media, and whereby said laser beam is irradiated on respective recording surfaces of said recording body for recording and reproducing of information signals.

3. An optical recording apparatus comprising:
   (a) an optical recording body comprising plural stacked optical recording media each comprising a single plate substrate and overwritable thin recording films which are formed on opposite surfaces of said substrate, each surface of said substrate having a continuous grove or a row of signal pits arranged along a spiral line so as to guide a laser beam, serving as recording and reproducing means, to a desired position, directions of the spiral lines of the opposite surfaces of said substrate being opposite to each other, wherein said single laser beam is used to produce optically detectable phase changes between plural states corresponding to irradiating conditions of the laser beam, said single laser beam being used to perform recording and reproducing on said recording films, said plural stacked optical recording media being stacked such that a distance between opposed surfaces of adjacent recording media is 5 mm or less; and directions of the spiral lines on likewise facing surfaces of the plural recording media being the same as each other;
   (b) means for rotating said recording body;
   (c) a plurality of floating type optical heads which are respectively provided adjacent both sides of said optical recording media and each of which comprises a movable part and a stationary part, said movable part comprising (i) a slider, (ii) one of a mirror or a prism, and (iii) an objective lens, said slider being subjected to resistance of surrounding air upon the rotation of said recording media in a predetermined direction to convert said resistance into a sliding force thereby causing the movable part to glide relative to the respective surfaces of said recording media at a predetermined distance therefrom, said mirror or said prism serving to deviate at an angle of 90 degrees a laser beam emanating from said stationary part, said objective lens serving to focus said laser beam from said mirror or said prism onto said recording media; and
   (d) an airtight box for encasing therein said optical recording body, said rotating means, and said optical heads, whereby said laser beam is irradiated on respective recording surfaces of said recording body for recording and reproducing of information signals.

4. An optical recording apparatus comprising:
(a) an optical recording body comprising an optical recording medium comprising a single plate substrate and overwritable thin recording films which are formed on opposite surfaces of said substrate, wherein a single laser beam is used to produce optically detectable phase changes between plural states corresponding to irradiating conditions of the laser beam, said single laser beam being used to perform recording and reproducing on said recording films; each surface of said substrate having a continuous groove or a row of signal pits arranged along a spiral line so as to guide said laser beam, serving as recording and reproducing means, to a desired position, directions of the spiral lines on oppositely facing surfaces of said optical recording media being opposite to each other;
(b) means for rotating said recording body;
(c) a plurality of floating type optical heads which are respectively provided adjacent both sides of said optical recording media and each of which comprises a movable part and a stationary part, said movable part comprising (i) a slider, (ii) one of a mirror or a prism, and (iii) an objective lens, said slider being subjected to resistance of surrounding air upon the rotation of said recording media in a predetermined direction to convert said resistance into a sliding force thereby causing the movable part to glide relative to the respective surfaces of said recording media at predetermined distance therefrom, said mirror or said prism serving to deviate at an angle of 90 degrees a laser beam emanating from said stationary part, said objective lens serving to focus said laser beam from said mirror or said prism onto said recording media; and
(d) an airtight box for encasing therein said optical recording medium, said rotating means and said optical heads,
whereby said laser beam is irradiated on respective recording surfaces of said recording body for recording and reproducing of information signals.

5. An apparatus of claim 1, 2, 3 or 4, wherein when signals are recorded on or reproduced from said optical recording medium or body, said rotating means rotates said optical recording medium or body at constant relative linear velocity with respect to said optical heads regardless of positions of said optical heads.

6. An apparatus of claim 1, 2, 3 or 4, wherein said recording layer is composed of a material which produces reversible phase changes between a thermally equilibrium phase and a thermally non-equilibrium phase or between a thermally non-equilibrium phase and another thermally non-equilibrium phase corresponding to conditions of laser irradiations.

7. An apparatus of claim 6, wherein said reversible phase change is produced between an amorphous phase and a crystalline phase of said recording film.

8. An apparatus of claim 1, 2, 3 or 4, wherein said recording layer is a film of a mixture of a first material producing optically detectable changes between plural states according to laser irradiation conditions, and a second material which is optically transparent to said laser beam, having higher melting point than said first material, and containing therein said first material as small particles.

9. An apparatus according to claim 8, wherein said first material is a phase change material producing reversible phase changes between a thermal equilibrium phase and a non-equilibrium phase or between a thermal non-equilibrium phase and another non-equilibrium phase, and changes in optical characteristics of said first material caused as a result of the phase change are detected as signals, thereby carrying out the rewritable recording.

10. An apparatus of claim 11, wherein said first material is a material producing reversible phase changes between an amorphous phase and a crystalline phase.

11. An apparatus of claim 1, 2, 3 or 4, wherein said optical recording medium or body has optically transparent protective layers of a thickness of hundreds $\mu$m at most for the top layer of each recording surface, laser beams being irradiated from the protective layer side.

12. An apparatus of claim 11, wherein the protective layer is composed of a DLC thin film.

13. An apparatus of claim 1, 2, 3 or 4, wherein said optical recording medium or body has a dielectric layer formed on at least one of said recording films.

14. An apparatus of claim 1, 2, 3, or 4, wherein said optical recording medium or body has reflective layers directly formed on said substrates.

15. An apparatus of claim 1, 2, 3 or 4, wherein said objective lens and said deflection prism or mirror are made of the same material to provide a monoblock body.

16. An apparatus of claim 15, wherein the numerical aperture of said objective lens is equal to or larger than 0.6.

17. An apparatus of claim 15, wherein the surfaces of said sliders faced to said recording medium are coated with DLC thin films.

* * * * *